United States Patent Office 3,534,023
Patented Oct. 13, 1970

3,534,023
TREMATOCIDE COMPOSITION AND PROCESS
William Adolf Lott, Maplewood, N.J., assignor to E. R. Squibb & Sons, Inc., New York, N.Y., a corporation of Delaware
No Drawing. Filed July 29, 1968, Ser. No. 748,183
Int. Cl. A01n 9/22, 9/24; A61k 27/00
U.S. Cl. 424—273                                  9 Claims

ABSTRACT OF THE DISCLOSURE

This invention relates to compositions and method for combating infections of trematodes in various animal species. Compositions containing 5-[(4-hydroxy-3-lower alkoxy)benzylidene] - 2-imino-1-lower alkyl-4-imidiazolidinone and especially 5-[(4-hydroxy-3-methoxy)benzylidene] - 2-imino-1-methyl-4-imidazolidinone are useful in ridding animals infected with trematodes particularly species of Fasciola and Schistosoma.

SUMMARY OF THE INVENTION

Many species of animals are subject to infection by flukes, parasites of the class Trematoda, which invade the blood, liver, intestine or lung. Domestic animals such as sheep, cattle as well as goats are particularly subject to infection with such parasites which are responsible for great economic loss.

It has been found that 5-[(4-hydroxy-3-lower alkoxy) benzylidene]-2-imino-1-lower alkyl-4-imidazolidinone, especially 5-[(4-hydroxy-3-methoxy)benzylidene]-2-imino-1-methyl-4-imidazolidinone, when given orally or injected into animals are effective in ridding the animals of parasites of the class Trematoda.

Trematodes which infect various species of animals and which result in serious economic loss in domestic animals include, for example, species of the genera Schistonoma, Fasciola, Clonorchis, Dicrocoelium. Opisthorchis, Echinostoma, Fasciolopsis, Gastrodisoides, Heterophyes, Metagonimus, Paragonimus, etc. *Schistosoma mansoni, Schistosoma japonicum, Schistosoma haematobium, Fasciola hepatica* and *Fasciola gigantica*, by way of example, are particularly of concern in animals such as sheep and cattle which are important economically as sources of wool, leather and meat, although other animal species such as mice, rabbits and dogs are also subject to trematode infections.

This invention is based on the discovery that compositions containing a 5-[(4-hydroxy-3-lower alkoxy)benzylidene]-2-imino-1-lower alkyl-4-imidazolidinone for oral or parenteral administration is effective as a means of treating animals infected with trematodes.

The 5 - [(4-hydroxy-3-lower alkoxy)benzylidene]-2-imino-1-lower alkyl-4-imidazolinone used in compositions of this invention are produced by condensing e.g., by heating a mixture of the reactants, a 4-hydroxy-3-(lower alkoxy)benzaldehyde such as vanillin, 4-hydroxy-3-ethoxybenzaldehyde or the like with a 2-imino-1-lower alkyl-4-imidazolidinone such as creatinine, 2 - imino-1-ethyl-4-imidazolidinone or the like. The 2-imino-1-lower alkyl-4 - imidazolidinone may be produced by reacting an N-alkylglycine with S-ethylpseudothiourea or cyanamide. The aldehydes may be obtained from natural sources or synthesized by the methods available in the art.

The imidazolidinones are effective in a range of about 1 to about 60 mg./kg., preferably about 20 to 50 mg./kg., given in a single dose, although multiple doses at more frequent intervals may be used or retreatment within 10 to 15 days if the infection requires. By way of example, the oral administration of 50 mg./kg. of 5-[(4-hydroxy-3-methoxy)benzylidene] - 2-imino-1-methoxy-4-imidazolidinone has shown 100% effectiveness against adult liver fluke, e.g., in the rabbit. Further, the minimum lethal dose in mice (orally) is about 400 mg./kg.

The compositions of this invention include various forms for oral or parenteral administration. The compositions, depending upon the type selected and, in part whether it is intended for a larger or smaller animal, may contain from about 0.5 to 50% or 75% on a weight basis, of the active substance. Thus, there may be about 15 to 75% in a solid oral form, about 10 to 75% in a liquid oral form, or about 5 to 50% in a parenteral form. The active substance may be made up in an oral form as a tablet or bolus containing the active substance along with the necessary excipients, binders, lubricants, etc. They may also be incorporated in mineral or salt blocks. A preferred form for oral administration is the oral drench in which up to about 10 to 75% (by weight) of the active substance is dissolved or suspended in an aqueous or oil vehicle containing adjuvants customarily added for stabilization and preservation of the composition.

An alternative form of administration is by injection, e.g., intramuscularly, with the conventional needle and syringe. In such cases a sterile solution or suspension for injection, e.g., in water or vegetable oil such as sesame oil, containing about 5 to 50% (by weight) of active ingredient is prepared.

As another alternative, the active substance may be admixed in the feed or in a premix for blending with a conventional feedstuff.

The following examples are illustrative of the invention.

EXAMPLE 1

In a large test tube is placed an intimate mixture of 11.3 g. (0.1 mole) of creatinine and 24 g. (0.16 mole) of vanillin. The test tube is placed in an oil bath, which is then heated to 170° C., and the mixture is melted while it is constantly agitated. The temperature of the mixture reaches 155° C. in about ten minutes; reaction then begins, and water is evolved. After three to five minutes longer, evolution of water ceases, and the mixture solidifies. The tube is heated for three minutes more, and then it is removed from the bath and allowed to cool.

When the temperature has fallen to 50–60° C., 50 ml. of ethyl alcohol is added and the mixture is heated gently by occasional immersion in the warm oil bath. The solid partially disintegrates and forms a suspension. The suspension is filtered, and the solid remaining in the tube is warmed with a second 50 ml. portion of alcohol. This operation is repeated until all the orange-colored condensation product has been transferred to the filter. The material on the filter is then washed with three successive 30 ml. portions of water at 60° C.

After drying, the crude 5 - [(4-hydroxy-3-methoxy) benzylidene] - 2 - imino - 1 - methyl-4-imidazolidinone weighs 24 g. (95% of theor.) and melts at 261–263° C. A pure product, which melts at 273° is obtained by recrystallizing the crude material from acetic acid.

EXAMPLE 2

By substituting an equivalent amount of 2-imino-1-ethyl-4-imidazolidinone for the creatinine in the procedure of Example 1, 5-[(4-hydroxy-3-methoxy)benzylidene]-2-imino-1-ethyl-4-imidazolidinone is obtained.

EXAMPLE 3

By substituting an equivalent amount of 3-ethoxy-4-hydroxy-benzaldehyde for the vanillin in the procedure of Example 1, 5-[(3-ethoxy-4-hydroxy)benzylidene]-2-imino-1-methyl-4-imidazolidinone is obtained.

In the interest of brevity, the compounds of the three foregoing examples are hereinafter referred to as Compounds I, II and II, respectively.

EXAMPLE 4

An oral drench for sheep is prepared from the following ingredients:

Compound I—12.5 kg.
Propylene glycol—1.0 kg.
Guar gum—1.0 kg.
Aluminum phosphate—3.0 kg.
Propyl paraben—200.0 gm.
Methyl paraben—20.0 gm.
Sodium hydroxide, qs.—pH 6–8
Water, qs.—100.0 liter The parabens are dissolved in water and the guar gum is added. The pH is adjusted with sodium hydroxide. The propylene glycol and Compound I are then added. Finally the aluminum phosphate is added and the mixture is stirred until homogeneous. An aqueous suspension containing 125 mg./ml. is obtained which is filled into vials each containing a 10 ml. dose for administration to sheep as an oral drench.

Aqueous suspensions of Compounds II and III may be similarly compounded.

EXAMPLE 5

An aqueous suspension for intramuscular injection is made from the following ingredients:

Compound I, micronized, sterile—500.0 gm.
Sodium carboxymethylcellulose, sterile—0.5 gm.
Polyvinyl pyrrolidone, sterile—3.0 gm.
Lecithin, sterile—20.0 gm.
Methyl paraben—1.0 gm.
Propyl paraben—0.1 gm.
Water for injection, qs.—1.0 liter The vehicle is sterilized by autoclaving at 121° C. for 1 hour. Compound I is added aseptically in increments with slow speed stirring. When suspension has been completed, the mixture is homogenized at 2000 lbs. pressure. The suspension is aseptically collected and degassed by applying vacuum. The sterile bulk is filled and sealed into sterile glass vials, each containing 4 ml. or multiple dose vials containing 500 mg./ml. of active ingredient. The compositions are administered by intramuscular injection, e.g., 4 ml. to sheep or 8 to 10 ml. to cattle.

Compounds II and III may each similarly be made up into injectable compositions.

EXAMPLE 6

Boluses, each weighing 7.0 gm. and containing 5.0 gm. of active ingredient, are made from the following ingredients:

Compound I—5.0 kg.
Polyvinyl pyrrolidone—0.2 kg.
Starch USP—0.5 kg.
Magnesium stearate USP—0.1 kg.
Lactose USP—1.2 kg.

Compound I and the lactose are admixed. A solution of polyvinyl pyrrolidone and water is made. The lactose and active ingredient are granulated. The granulate is screened, dried and rescreened. The starch and magnesium stearate are added and the mixture compressed into boluses of 7 gm. each.

Compounds II and III may each be similarly formed into boluses for oral administration.

What is claimed is:

1. A composition for treating trematode infections comprising 5-[(4-hydroxy-3-lower alkoxy)benzylidene]-2-imino-1-lower alkyl-4-imidazolidinone, wherein lower alkoxy and lower alkyl contain from one to two carbon atoms, in an amount within the range from about 0.5 to about 75% by weight of the composition and the balance comprising an oral or injectable carrier therefor selected from the group consisting of aqueous suspensions, oil suspensions, solid carriers, sterile solutions for injection and sterile suspensions for injection.

2. A composition as in claim 1 wherein in the imidazolidinone the lower alkoxy group is methoxy and the lower alkyl group is methyl.

3. A composition as in claim 1 wherein in the imidazolidinone the lower alkoxy group is methoxy and the lower alkyl group is ethyl.

4. A composition as in claim 2 comprising a solid carrier containing about 15 to 75% by weight of the imidazolidinone.

5. A method for treating trematode infection in animals which comprises administering to the infected animal orally or parenterally 5-[(4-hydroxy-3-lower alkoxy)benzylidene]-2-imino-1-lower alkyl-4-imidazolidinone, wherein lower alkoxy and lower alkyl have from one to two carbon atoms, in an amount of about 1 to 60 mg. per kg.

6. A method for treating trematode infection in accordance with claim 5 wherein the trematode is of the species Fasciola.

7. A method for treating trematode infection in accordance with claim 5 wherein the trematode is of the species Schistosoma.

8. A method for treating trematode infection in accordance with claim 5 wherein the trematode is of the species Fasciola, which comprises administering to the animal orally or parenterally 5[(4-hydroxy-3-methoxy)benzylidene]-2-imino-1-methyl-4-imidazolidinone in an amount of about 1 to 60 mg. per kg.

9. A method for treating trematode infection in accordance with claim 5 wherein the trematode is of the species Schistosoma, which comprises administering to the animal orally or parenterally 5-[(4-hydroxy-3-methoxy)benzylidene]-2 - imino-1-methyl-4-imidazolidinone in an amount of about 1 to 60 mg. per kg.

References Cited

Chemical Abstracts, vol. 63, 1965, 4116f.
Chemical Abstracts, vol. 67, 1967, 2022R.

ALBERT T. MEYERS, Primary Examiner

L. SCHENKMAN, Assistant Examiner

U.S. Cl. X.R.

260—309.7